United States Patent
Patil et al.

(10) Patent No.: US 9,432,740 B2
(45) Date of Patent: *Aug. 30, 2016

(54) ENHANCED INFORMATION ON MOBILE DEVICE FOR VIEWED PROGRAM AND CONTROL OF INTERNET TV DEVICE USING MOBILE DEVICE

(71) Applicant: SONY CORPORATION, Tokyo (JP)

(72) Inventors: Abhishek Patil, San Diego, CA (US); Sriram Sampathkumaran, San Diego, CA (US); Guru Prashanth Balasubramanian, San Diego, CA (US); Dipendu Saha, San Diego, CA (US); Meeta Jain, Durham, NC (US); Aravind Babu Asam, San Diego, CA (US); Seungwook Hong, San Diego, CA (US)

(73) Assignee: Sony Corporation, Tokyo (JP)

( * ) Notice: Subject to any disclaimer, the term of this patent is extended or adjusted under 35 U.S.C. 154(b) by 315 days.

This patent is subject to a terminal disclaimer.

(21) Appl. No.: 13/921,465

(22) Filed: Jun. 19, 2013

(65) Prior Publication Data

US 2013/0283314 A1  Oct. 24, 2013

Related U.S. Application Data

(62) Division of application No. 13/248,566, filed on Sep. 29, 2011, now Pat. No. 8,863,196.

(60) Provisional application No. 61/417,978, filed on Nov. 30, 2010.

(51) Int. Cl.
*H04N 5/445* (2011.01)
*H04N 21/482* (2011.01)
*H04N 21/422* (2011.01)

(52) U.S. Cl.
CPC ...... *H04N 21/482* (2013.01); *H04N 21/42216* (2013.01); *H04N 21/4828* (2013.01)

(58) Field of Classification Search
CPC ........... H04N 21/25816; H04N 21/4126; H04N 21/422; H04N 21/42204; H04N 21/42684; H04N 21/436; H04N 21/4367; H04N 21/441; H04N 21/60; H04N 21/632; H04N 21/6334; H04N 21/42216; H04B 1/205; H04W 12/06; H04L 29/06755
USPC .................................................. 725/25, 109
See application file for complete search history.

(56) References Cited

U.S. PATENT DOCUMENTS 6,466,779 B1   10/2002  Moles et al.
6,687,245 B2 *  2/2004  Fangman .......... H04L 29/06027
                                                        370/356

(Continued)

FOREIGN PATENT DOCUMENTS

WO     2014003781 A1    1/2014

OTHER PUBLICATIONS

Graham Clift, Jenke Wu Kuo, "Automatic Discovery and Mirroring of Server-Client Remote User Interface (RUI) Session on a Companion Device and Synchronously Controlling Both Sessions Using RUI on Companion Device" file history for related pending U.S. Appl. No. 13/861,610 filed Apr. 12, 2013.

(Continued)

*Primary Examiner* — An Son P Huynh
(74) *Attorney, Agent, or Firm* — John L. Rogitz

(57) ABSTRACT

The user of an Internet TV device can control the Internet TV device using a mobile device such as a smart phone. The smart phone also obtains program information from the Internet TV device and sends the information to a server as a search term, presenting supplemental program information received from the server on the display of the mobile device so that a person can browse the supplemental information without disturbing viewers of the Internet TV device. The mobile device can also grab a link related to the program from the Internet TV device and use that link as a recommendation to friends on social networking sites.

9 Claims, 3 Drawing Sheets

(56) References Cited

U.S. PATENT DOCUMENTS

| | | | |
|---|---|---|---|
| 7,360,232 B2 | 4/2008 | Mitchell | |
| 7,477,321 B2 | 1/2009 | Yokoyama et al. | |
| 7,627,341 B2 | 12/2009 | Wu | |
| 7,634,263 B2 | 12/2009 | Louch et al. | |
| 7,673,316 B2 | 3/2010 | Incentis Carro | |
| 8,010,987 B2 | 8/2011 | Nygaard et al. | |
| 8,266,648 B2* | 9/2012 | Olague | H04N 5/44543 725/25 |
| 8,266,666 B2 | 9/2012 | Friedman | |
| 8,307,395 B2 | 11/2012 | Issa et al. | |
| 8,341,289 B2 | 12/2012 | Hellhake et al. | |
| 8,736,427 B2* | 5/2014 | King | G06F 13/385 340/12.22 |
| 8,839,306 B2* | 9/2014 | Roberts | H04N 7/17318 725/11 |
| 8,863,196 B2* | 10/2014 | Patil | H04N 21/42216 725/109 |
| 2004/0047599 A1 | 3/2004 | Grzeczkowski | |
| 2005/0028208 A1 | 2/2005 | Ellis et al. | |
| 2005/0086447 A1* | 4/2005 | Miyamoto | G06F 21/6218 711/163 |
| 2005/0120381 A1 | 6/2005 | Yamaguchi | |
| 2005/0138192 A1 | 6/2005 | Encarnacion et al. | |
| 2005/0177641 A1* | 8/2005 | Yamagami | H04L 63/101 709/229 |
| 2005/0177861 A1 | 8/2005 | Ma et al. | |
| 2005/0210145 A1* | 9/2005 | Kim | G06F 17/30849 709/231 |
| 2005/0240660 A1 | 10/2005 | Sakao et al. | |
| 2005/0251823 A1 | 11/2005 | Saarikivi | |
| 2005/0251827 A1 | 11/2005 | Ellis et al. | |
| 2005/0262542 A1* | 11/2005 | DeWeese | H04L 12/1818 725/106 |
| 2006/0031779 A1 | 2/2006 | Theurer et al. | |
| 2006/0041916 A1 | 2/2006 | McQuaide | |
| 2006/0041923 A1 | 2/2006 | McQuaide | |
| 2006/0140170 A1 | 6/2006 | Dorner | |
| 2006/0161635 A1* | 7/2006 | Lamkin | G06F 17/30041 709/217 |
| 2006/0190966 A1 | 8/2006 | McKissick et al. | |
| 2006/0242374 A1* | 10/2006 | Slater | G06F 3/0622 711/163 |
| 2006/0270452 A1 | 11/2006 | Gerzberg | |
| 2006/0271968 A1 | 11/2006 | Zellner | |
| 2007/0157281 A1* | 7/2007 | Ellis | H04N 7/17309 725/134 |
| 2007/0180382 A1 | 8/2007 | Kortum et al. | |
| 2007/0192464 A1* | 8/2007 | Tullberg | H04L 29/12009 709/223 |
| 2007/0199015 A1* | 8/2007 | Lopez | H04N 7/1675 725/31 |
| 2007/0204231 A1* | 8/2007 | Cunningham | H04L 41/22 715/734 |
| 2008/0117922 A1* | 5/2008 | Cockrell | H04L 12/66 370/401 |
| 2008/0148331 A1 | 6/2008 | Walter et al. | |
| 2008/0148335 A1* | 6/2008 | Dawson | H04N 21/4104 725/132 |
| 2008/0163330 A1 | 7/2008 | Sparrell | |
| 2008/0301729 A1 | 12/2008 | Broos et al. | |
| 2009/0019492 A1 | 1/2009 | Grasset | |
| 2009/0061841 A1* | 3/2009 | Chaudhri | H04M 1/72527 455/420 |
| 2009/0063994 A1* | 3/2009 | Pickelsimer | G06F 17/30017 715/753 |
| 2009/0089742 A1 | 4/2009 | Nagulu et al. | |
| 2009/0094031 A1* | 4/2009 | Tian | G10L 21/00 704/251 |
| 2009/0119604 A1 | 5/2009 | Simard et al. | |
| 2009/0133069 A1* | 5/2009 | Conness | H04N 5/44543 725/46 |
| 2009/0233629 A1 | 9/2009 | Jayanthi | |
| 2009/0280744 A1* | 11/2009 | Brown | H04W 8/005 455/41.2 |
| 2010/0011299 A1 | 1/2010 | Brodersen et al. | |
| 2010/0031299 A1 | 2/2010 | Harrang et al. | |
| 2010/0132015 A1* | 5/2010 | Lee | G06F 21/57 726/3 |
| 2010/0217806 A1* | 8/2010 | Khot | G06Q 10/107 709/206 |
| 2011/0078717 A1* | 3/2011 | Drummond | H04N 21/4586 725/14 |
| 2011/0128228 A1* | 6/2011 | Van Der Byl | G06F 1/1624 345/167 |
| 2011/0154436 A1* | 6/2011 | Jian | H04L 63/08 726/2 |
| 2011/0195665 A1* | 8/2011 | Friedlaender | G08C 17/02 455/41.2 |
| 2011/0202854 A1 | 8/2011 | Chan et al. | |
| 2011/0209177 A1 | 8/2011 | Sela et al. | |
| 2011/0314173 A1 | 12/2011 | Lyu | |
| 2012/0072944 A1* | 3/2012 | Felt | H04N 21/47214 725/25 |
| 2012/0072951 A1* | 3/2012 | King | G08C 17/02 725/37 |
| 2012/0117168 A1 | 5/2012 | Sugiyama et al. | |
| 2012/0162536 A1 | 6/2012 | Sibilsky et al. | |
| 2013/0086166 A1 | 4/2013 | Findlay et al. | |
| 2013/0088629 A1 | 4/2013 | Ryu | |
| 2013/0176491 A1 | 7/2013 | Kataoka et al. | |
| 2013/0212629 A1 | 8/2013 | Chien et al. | |
| 2013/0251336 A1 | 9/2013 | Roberts et al. | |
| 2014/0028707 A1 | 1/2014 | Kapoor | |
| 2014/0189602 A1 | 7/2014 | Wang et al. | |

OTHER PUBLICATIONS

Graham Clift, Jenke Wu Kuo, "Automatic Discovery and Mirroring of Server-Client Remote User Interface (RUI) Session on a Companion Device and Synchronously Controlling Both Sessions Using RUI on Companion Device", related U.S. Appl. No. 13/861,610, Non-Final Office Action dated Apr. 2, 2015.

Graham Clift, Jenke Wu Kuo, "Automatic Discovery and Mirroring of Server-Client Remote User Interface (RUI) Session on a Companion Device and Synchronously Controlling Both Sessions Using RUI on Companion Device", related U.S. Appl. No. 13/861,610, Applicant's response to Non-Final Office Action filed Apr. 7, 2015.

Graham Clift, Jenke Wu Kuo, "Automatic Discovery and Mirroring of Server-Client Remote User Interface (RUI) Session on a Companion Device and Synchronously Controlling Both Sessions Using RUI on Companion Device", related U.S. Appl. No. 13/861,610, Applicant's response to Final Office Action filed Jul. 35, 2015.

Graham Clift, Jenke Wu Kuo, "Automatic Discovery and Mirroring of Server-Client Remote User Interface (RUI) Session on a Companion Device and Synchronously Controlling Both Sessions Using RUI on Companion Device", related U.S. Appl. No. 13/861,610, Applicant's response to Final Office Action filed Jul. 30, 2015.

* cited by examiner

ENHANCED INFORMATION ON MOBILE DEVICE FOR VIEWED PROGRAM AND CONTROL OF INTERNET TV DEVICE USING MOBILE DEVICE

This application is a divisional of Ser. No. 13/248,566 filed Sep. 29, 2011 which claims priority to U.S. provisional application Ser. No. 61/417,978, filed Nov. 30, 2010 priority to both of these application is claimed. This application incorporates by reference U.S. provisional patent application Ser. No. 61/418,004, filed Nov. 30, 2010, and U.S. patent application Ser. No. 13/095,018, filed Apr. 27, 2011 and Ser. No. 13/155,881, filed Jun. 8, 2011.

FIELD OF THE INVENTION

The present application relates generally to controlling an Internet TV device including controlling a software application executing on the Internet TV device using mobile devices such as smart phones and the like and enabling a user to browse for more information related to the content that is currently playing on the Internet TV device via the linked mobile device.

BACKGROUND OF THE INVENTION

Internet TV systems such as Sony's Bravia Internet Video (BIV) make it possible for different online content providers to present their content in a uniform way to customers. In this way, a viewing experience is provided that is rich with content and features.

TVs are now controlled at a distance by the ubiquitous remote control or remote commander (RC) for ease and viewer convenience. As understood herein, however, additional convenient features can be provided by configuring a consumer electrons (CE) device such as a smart phone for the dual purpose of not only remotely controlling an Internet TV, but also to provide enhanced functionality (e.g., gathering additional information, recommendations, sharing via social networking etc) that a conventional RC cannot provide.

SUMMARY OF THE INVENTION

Present principles recognize that a CE device such as a smart phone can be used not only to provide input commands to a smart Internet TV, but also for the enhanced purposes of browsing channels, browsing content within channels, and viewing metadata about content without requiring a viewer to exit or decimate video being displayed on a TV as he otherwise currently would need to do. Moreover, present principles recognize that a CE device can be used to control a TV and also obtain a network link into content playing on the TV to enable a user to share the link with a friend without disturbing the content already playing on the TV screen.

Accordingly, an audio video display device (AVDD) includes housing, a display on the housing, a network interface, and a processor in the housing controlling the display and communicating with the Internet through the network interface. The processor executes logic that includes presenting a user interface (UI) on the display of the AVDD prompting a user to select whether to allow the AVDD to be wirelessly controlled from a mobile control device (MCD). The UI enables the user to select for the AVDD not to be controlled by any MCD and to select for the AVDD to be controlled by an MCD.

If desired, the UI can enable the user to select to be controlled from any MCD executing device discovery and authentication in accordance with discovery protocols recognized by the AVDD. Example UIs enable the user to select to be controlled from only predetermined MCDs and not to be controlled from any other MCD. As set forth further below, in addition to the above the processor, responsive to a discovery signal from an MCD not authorized to control the AVDD, recognizes the discovery signal but does not respond to it such that the AVDD remains hidden from the MCD.

Additional features described herein include the processor providing program information to the MCD to enable the MCD to obtain supplemental information related to a program being presented on the AVDD and to browse the supplemental information transparently to the AVDD so as not to disturb viewers of the AVDD. Furthermore, the processor can provide a network link to the MCD which is related to a program being presented on the AVDD to enable the MCD to send the link to social networking friends of a user of the MCD to recommend the program to the friends.

In another aspect, a method includes allowing a mobile device communicating with an audio video display device (AVDD) to obtain program information from the AVDD. The method includes sending the information to a server as a search term, and receiving from the server in response to the search term supplemental program information. The supplemental information is presented on a display of the mobile device so that a person can browse the supplemental information without disturbing viewers of the original playback on the display device.

In another aspect, a system includes a mobile control device (MCD) which has a display and a processor controlling the display and configured to communicate with an audio video display device (AVDD). The processor accesses a computer readable storage medium bearing instructions which when executed by the processor cause the processor to establish communication with the AVDD, and query the AVDD for program information pertaining to a program being currently presented on the AVDD. The processor presents on the display current program information from the AVDD. Automatically and transparently to the AVDD, the processor sends to a server the program information as a query for supplemental program information, receives from the server the supplemental program information, and presents on the display the supplemental program information. This enables a user to browse the supplemental program information transparently to the AVDD such that viewers of the AVDD observe none of the supplemental information being browsed on the MCD.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
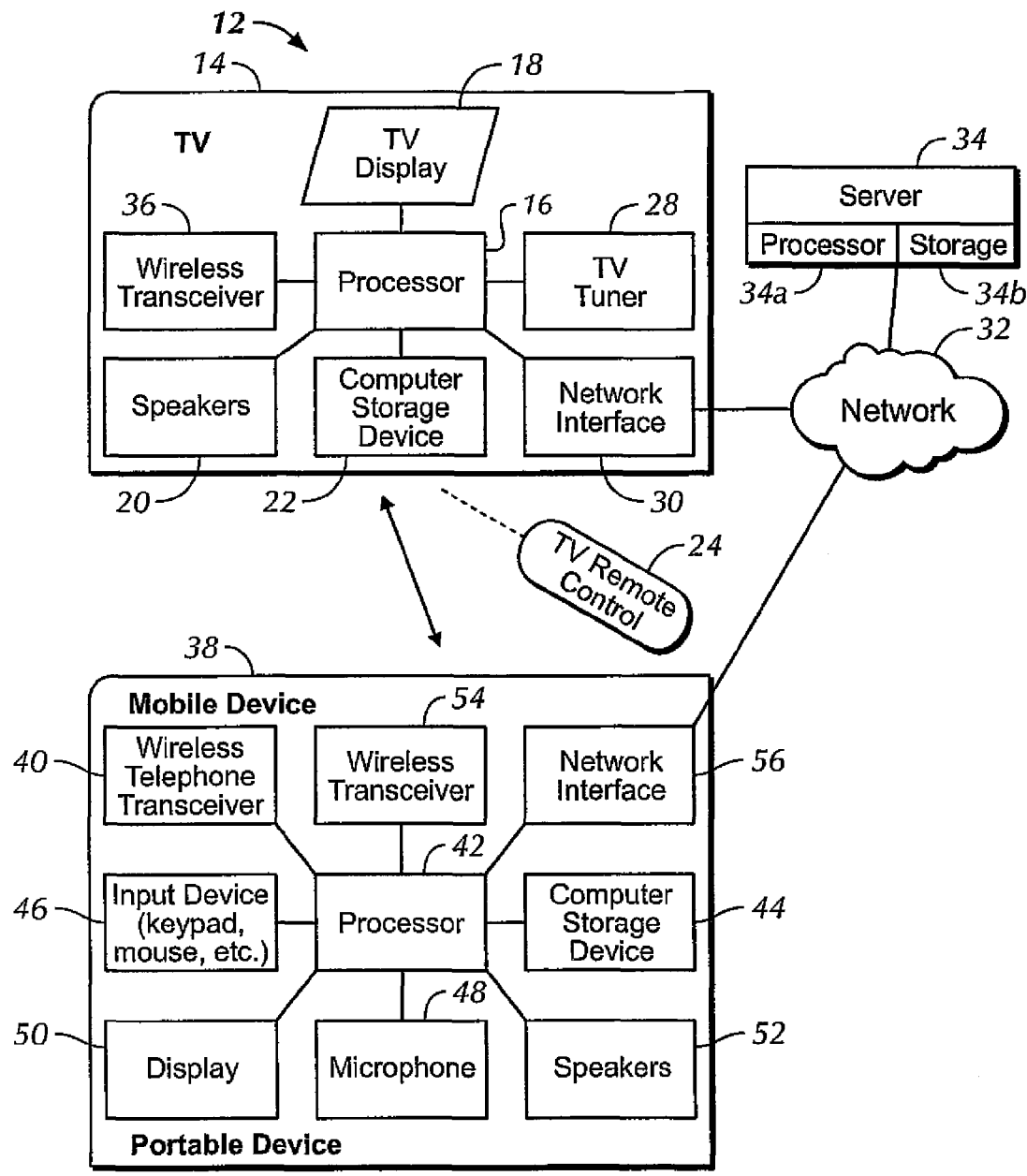
FIG. 1 is a block diagram of an example system in accordance with present principles.

Referring initially to FIG. 1, an audio video display device (AVDD) 12 such as a TV, game player, or video disk player includes a housing 14 bearing a digital processor 16. The processor 16 can control a visual display 18 and an audible display 20 such as one or more speakers. The visual display may be a touch sensitive display.

To undertake present principles, the processor 16 may access one or more computer readable storage media such as but not limited to RAM-based storage 22 (e.g., a chip implementing dynamic random access memory (DRAM)) and/or flash memory and/or disk-based storage. Software code implementing present logic executable by the AVDD 12 may be stored on one of the memories to undertake present principles.

If desired, the processor 16 can receive user input signals from various input devices, including a remote control (RC) 24. A TV tuner 28 may be provided in some implementations particularly when the AVDD is embodied by a TV to receive TV signals from a source such as a set-top box, satellite receiver, cable head end, terrestrial TV signal antenna, etc. Signals from the tuner 28 are sent to the processor 16 for presentation on the display 18 and speakers 20.

As shown in FIG. 1, a network interface 30 such as a wired or wireless modem or wireless telephony transceiver communicates with the processor 16 to provide connectivity through the Internet 32 to one or more content servers 34. The servers 34 have respective processors 34a and respective computer readable storage media 34b.

The AVDD 12 may also include a wireless transceiver 36 such as a Bluetooth or WiFi transceiver for communicating with a mobile control device (MCD) 38, such as, for instance, a mobile telephone having a wireless telephony transceiver 40 communicating with a processor 42 accessing one or more computer readable storage media 44 to execute logic herein. The processor 42 may receive user input from a user input device 46 such as a keypad, mouse, other point and click device, etc. and a microphone 48 for receiving voice commands which are processed into digital signals by the processor 42 executing a voice recognition engine stored on the medium 44. The processor 42 may output video on a video display 50, which may be a touch sensitive display, and audio to one or more speakers 52. The processor 42 may communicate with a MCD wireless transceiver 54 that is configured to communicate with the wireless transceiver 36 of the AVDD 12. The processor 42 may also communicate with the Internet 32 using the wireless telephony transceiver 40 or using a separate wired or wireless network interface 56.

Figure 2:
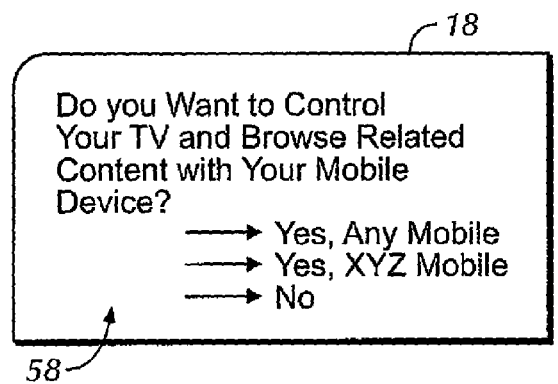
FIG. 2 is an example screen shot of a user interface that enables a user to allow or disallow discovery of the TV by a mobile device.

FIG. 2 shows a user interface 58 that can be presented on the display 18 of the AVDD 12 to support logic below. The UI 58 can be presented from a setup menu if desired. As shown, the UI 58 asks a user to select whether to allow the AVDD 12 to be controlled from a mobile device. The user may select not to be controlled at all, or may select to be controlled from any mobile device executing device discovery and authentication in accordance with the discovery protocols recognized by the AVDD 12. Yet again, the user may select for the AVDD to be controlled only by certain ("XYZ" company, e.g.) mobile devices as shown. Thus, the user may select for the AVDD to be controlled only by mobile devices made by a particular manufacturer or running a particular operating system.

Figure 3:
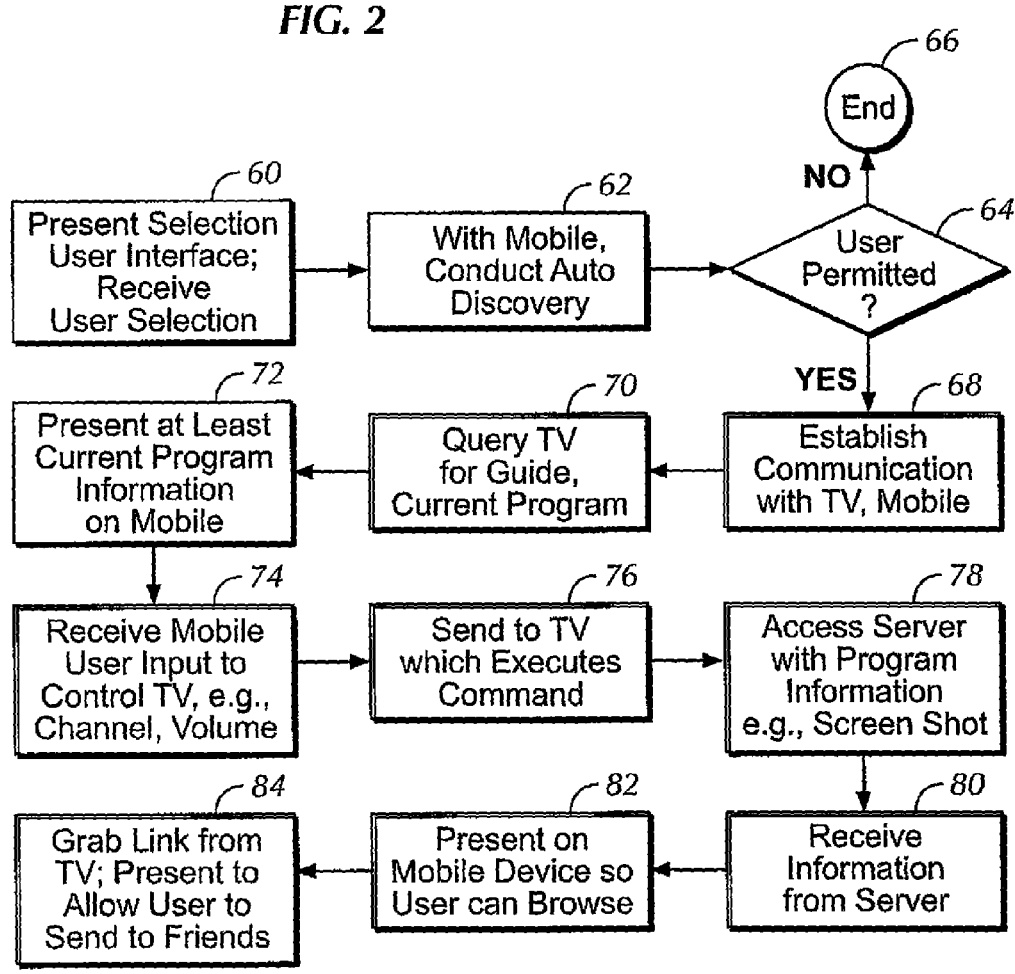
FIG. 3 is a flow chart of example logic in accordance with present principles.

FIG. 3 shows example logic in the form of a flow chart beginning at block 60, in which the UI 58 of FIG. 2 is presented on the AVDD display 18. The user selection of whether and what mobile devices may be used to control the AVDD are received. Then, at block 62, the MCD 38 conducts automatic discovery using, e.g., the wireless transceiver 40 to ascertain any devices including the AVDD 12 that may be in close enough proximity to communicate with the MCD 38.

Decision diamond 64 indicates that the MCD 38 determines whether any devices in proximity to the MCD 38 are permitted to respond to the discovery signals sent from the MCD 38. If the user has selected "no" from the UI 58 in FIG. 2 or if the user has selected control by a mobile device category of which the MCD 38 is not a part, the logic ends at state 66, in which the AVDD 12 essentially refuses to respond to device discovery signals from the MCD 38 and thus remains hidden from the MCD 38. In contrast, however, if the user has elected to have the AVDD 12 controlled by a mobile device of the type of the MCD 38, the logic moves form decision diamond 64 to block 68.

At block 68, the MCD 38 establishes communication with the AVDD 12. Proceeding to block 70, the MCD 38 queries the AVDD 12 for program information pertaining to the program being currently presented on the AVDD 12 such as title, channel, electronic program guide (EPG) information, etc. The current image being presented on the AVDD display 18 may also be obtained by the MCD 38. Also, any network addresses that may accompany the metadata of the program being presented on the AVDD 12 may be sent to the MCD 38.

Moving to block 72, the MCD 38 presents on its display 50 current program information from the AVDD 12. The user of the MCD 38 may then input AVDD commands using, e.g., the touch display 50 or the input device 46 which are received at block 74 and sent via the transceivers 40, 36 to the AVDD processor 16 at block 76, which executes the commands. The commands may include, e.g., channel change commands, volume change commands, video display setting commands, etc. Channel change commands can include changing TV channels per se as well as and changing channels within a recommendation application.

Also, the MCD 38, automatically and transparently to the AVDD 12, may access at block 78 the server 34 using the program information it obtained at block 70. For example, the MCD 38 may send to the server 34 a query for information using the name of the program being presented on the AVDD 12 as entering argument. Or, the MCD 38 may present on the MCD display 50 a screen shot of the image being presented on the AVDD 12 so that a person may touch an item of interest (such as an actor's face) on the display, identifying the item as being of interest. In this case, the image of the item of interest is sent to the server 34 for identification of the item, which identification is used as a search term. The above-identified U.S. patent application Ser. No. 13/155,881, filed Jun. 8, 2011 provides further details of searching by image.

In any case, the AVDD program information sent to the server 34 by the MCD 38 is used by the server 34 to search for supplemental information related to the search term, typically returning to the MCD 38 a list of matching web sites at block 80. The list is presented on the MCD 38 at block 82, enabling the user to browse the list, which can include links to scenes from the program being presented on the AVDD 12.

Additionally, the above-mentioned network link that the MCD 38 obtained from the AVDD 12 can be presented at block 84 on the MCD 38. The user of the MCD 38 may be permitted by means of the link to recommend the program being presented on the AVDD 12 to friends in one or more social networking Internet groups using, e.g., the UI shown in FIG. 4 and described below.

Figure 4:
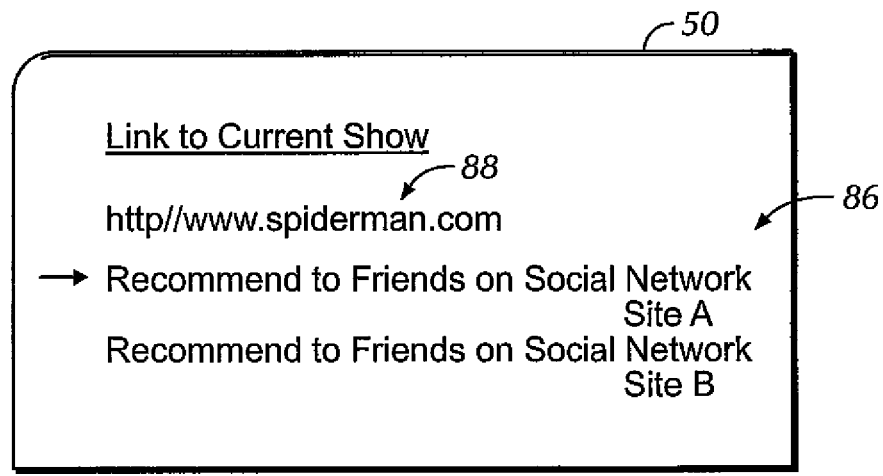
FIG. 4 is an example screen shot of the mobile device allowing a user to share a line from a current program with friends on social network sites.

Accordingly, turning now to FIG. 4, a UI 86 may be presented on the MCD display 50 showing the link 88 to the program being currently presented on the AVDD 12. The UI 86 may include a selection to enable the user to send the link to his or her friends on social network group "A", and/or social network group "B", etc. Selection of a social networking group causes the MCD 38 to send the link to recipients in the group using, e.g., the telephony transceiver 40 or network interface 56 along with a message such as "watching this show, it's great" or other recommendation. It may now be appreciated that a link accompanying a program presented on the AVDD 12 can be automatically provided to the MCD 38 for using the link as a recommendation to friends of the user transparently to the AVDD 12.

While the particular ENHANCED INFORMATION ON MOBILE DEVICE FOR VIEWED PROGRAM AND CONTROL OF INTERNET TV DEVICE USING MOBILE DEVICE is herein shown and described in detail, it is to be understood that the subject matter which is encompassed by the present invention is limited only by the claims.

What is claimed is:

1. Method, comprising:
presenting on a display of an audio video display device (AVDD) at least one user interface (UI), the at least one UI including at least a first selector selectable to allow the AVDD to be wirelessly controlled by mobile devices (MD), the at least one UI including at least a second selector selectable to allow the AVDD to be controlled by MDs only from a first manufacturer and not to be controlled by MDs from manufacturers other than the first manufacturer;
responsive to receiving a selection of the first selector, responding to a signal from a MD regardless of whether the MD is made by the first manufacturer or a manufacturer other than the first manufacturer;
responsive to receiving a selection of the second selector:
responding to a signal from a MD made by the first manufacturer; and
not responding to a signal from a MD not made by the first manufacturer such that the AVDD remains hidden from the MD not made by the first manufacturer.

2. The method of claim 1, further comprising obtaining a link related to a program being presented on the AVDD from the AVDD and sending the link from the mobile device as a recommendation to friends in a social networking group.

3. System comprising:
at least one computer memory that is not a transitory signal and that comprises instructions executable by at least one processor to:
present on at least one video display of an audio video device (AVD) at least one user interface (UI), the at least one UI including a first selector selectable to permit the AVD to respond to a discovery signal from a mobile device (MD) regardless of a provider of the MD, the at least one UI including at least a second selector selectable to permit the AVD to respond to discovery signals only from MDs provided by a third provider;
responsive to selection of the first selector, respond to discovery signals from first and second MDs provided by respective first and second providers; and
responsive to selection of the second selector, respond to discovery signals only from first MDs provided by the third provider and not responding to discovery signals from second MDs not provided by the third provider.

4. The system of claim 3, wherein the instructions are executable to receive from the AVD a network address accompanying metadata of a program being presented on the AVD.

5. The system of claim 4, wherein the instructions are executable to present a user interface (UI) on the display to allow a user of the MD to recommend to social networking site friends of the user the program being currently presented on the AVD.

6. The system of claim 3, wherein the instructions are executable to receive user input and to send commands corresponding to the user input to the AVD to control the AVD.

7. The system of claim 6, wherein the commands include channel change commands within a recommendation engine.

8. The system of claim 6, wherein the commands include volume change commands.

9. The system of claim 3, comprising the AVD.

* * * * *